June 13, 1967 W. P. MANNING 3,325,808
ELECTROMAGNETIC ENERGY ATTENUATOR
Filed Sept. 7, 1965 2 Sheets-Sheet 1
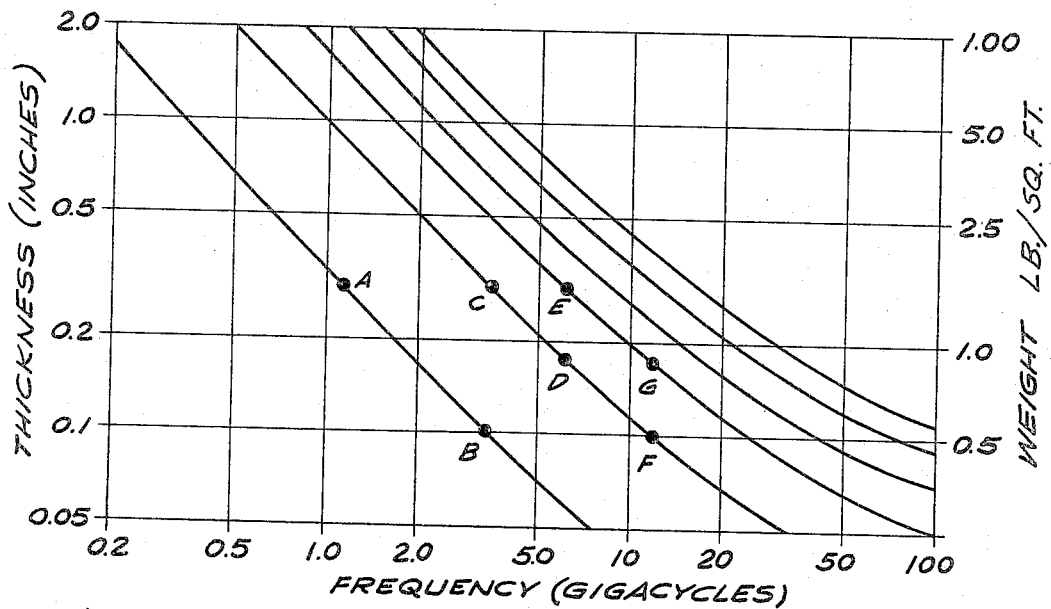
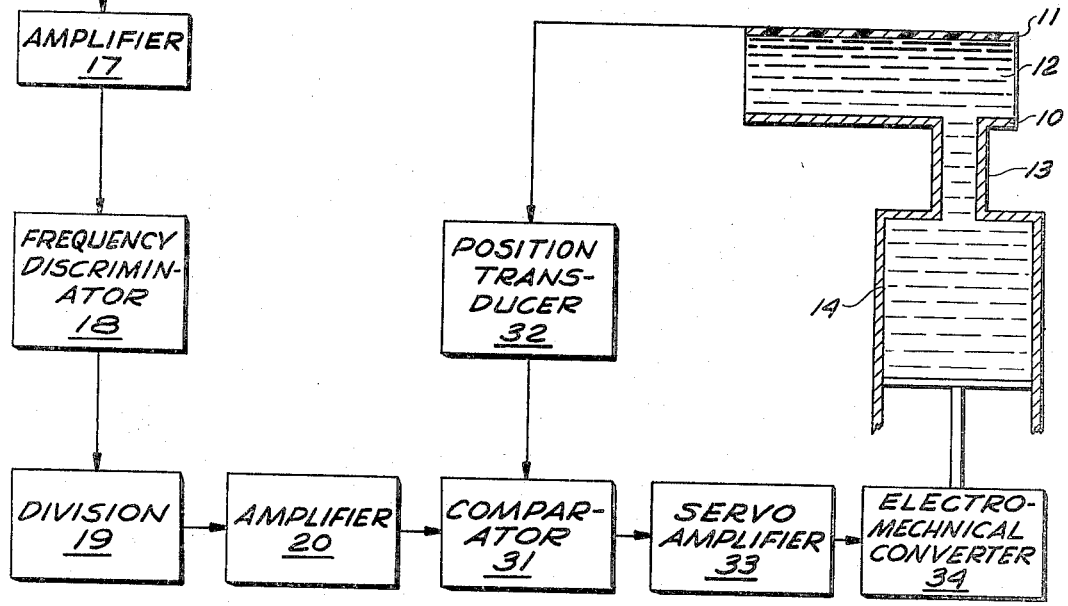
INVENTOR.
WILLIAM P. MANNING
BY Richard D. Seibel
ATTORNEY June 13, 1967 W. P. MANNING 3,325,808
ELECTROMAGNETIC ENERGY ATTENUATOR
Filed Sept. 7, 1965 2 Sheets-Sheet 2
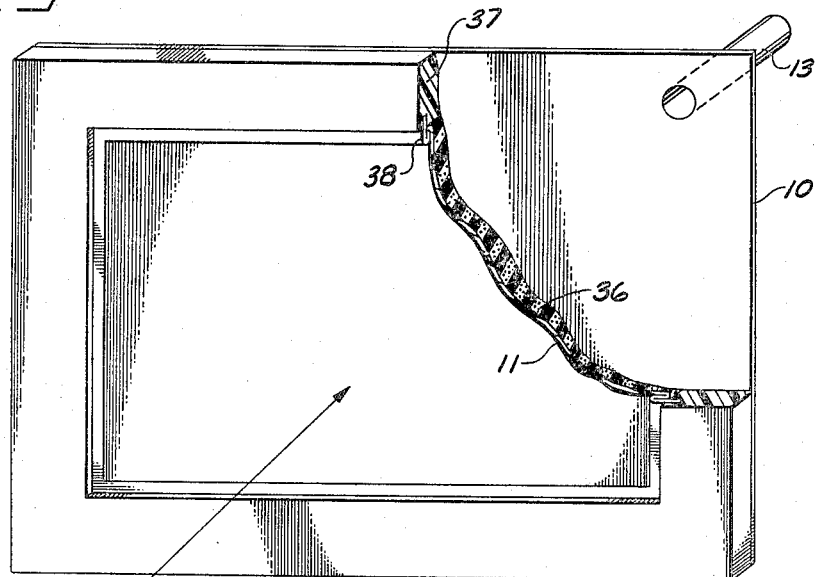
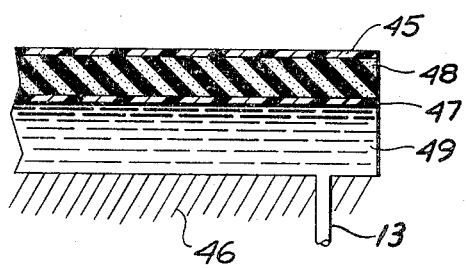
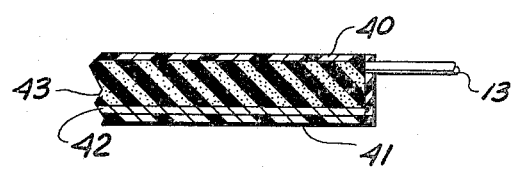
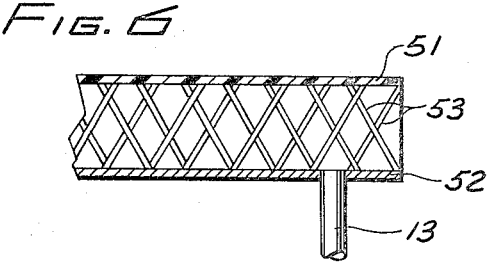
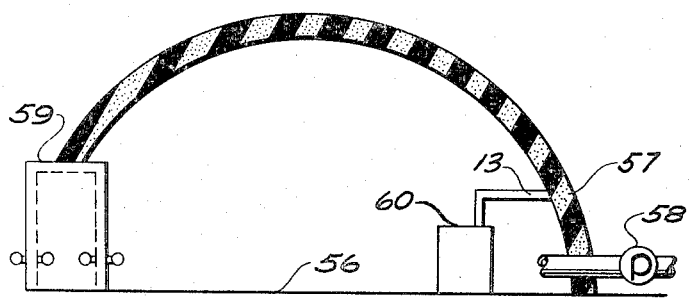
INVENTOR.
WILLIAM P. MANNING
BY Richard D. Seibel
ATTORNEY United States Patent Office 3,325,808
Patented June 13, 1967

3,325,808
ELECTROMAGNETIC ENERGY ATTENUATOR
William P. Manning, Tulsa, Okla., assignor to
North American Aviation, Inc.
Filed Sept. 7, 1965, Ser. No. 485,493
17 Claims. (Cl. 343—18)

This invention relates to attenuation of electromagnetic energy and in particular to a quarter wave absorber for radar energy.

Modern weapon systems employ radar extensively for the detection and location of targets and counter weapons, therefore it is desirable to provide radar camouflage as well as optical camouflage for weapons and potential targets. Radar camouflage is accomplished by minimizing the reflection of radar from a target, such as, for example, a vehicle or building. Reflection can be reduced by covering the surface of a target with a radar absorbing material or by forming the structure of radar transparent or absorbing material. The absorption of radar frequency radiation attenuates the energy in the radar beam and reduces reflection from a target.

Various structures have been devised for the attenuation of radar energy impinging on surfaces having an extent much larger than the wavelength of the radar. Some of these structures have incorporated relatively thick layers of dielectric material having a steady gradation of electric properties so that energy is absorbed in depth. Such attenuators serve to reduce radar reflectance over a relatively broad band of frequency. However, these attenuators are relatively heavy and still have substantial reflectance. Other absorbers have been made employing a conductive layer with a resistive layer spaced one-quarter wave length away from the conductive layer. This is what is known as a quarter wave absorber or Salisbury screen. The quarter wave absorber has electrical properties that tune the absorber to a peak of attenuation at a single frequency and attenuation of other frequencies is low. Since the prior art quarter wave absorber used for radar camouflage is usable at only a single frequency, sandwiches of quarter wave absorbers have been devised to provide attenuation over a broader frequency range. Although useful for many applications, such attenuators are bulky and do not provide optimum attenuation over the entire frequency range.

It is therefore a broad object of this invention to provide a radar attenuator useful over a broad frequency range.

Thus in the practice of this invention according to a preferred embodiment there is provided a radar camouflage system comprising a quarter wave absorber that is tunable over a range of frequencies by varying the effective electrical thickness of the absorber to obtain optimum attenuation at the frequency of impinging radar. As illustrated in a preferred embodiment there is provided an electrically conductive ground plane and an electrically resistive layer giving a front surface impedance of about 377 ohms per square arranged substantially parallel to the conductive ground plane. A fluid dielectric material such as water is interposed between the ground plane and the resistive layer to reduce the wave length of received radar radiation in the absorber to a fraction of the wave length of radar radiation in free space. Means are provided for detecting the frequency of radar incident on the attenuator and the distance between the resistive layer and the ground plane is adjusted to have a value equal to $n/4$ times the wave length of radiation traveling through the dielectric liquid where $n$ is an odd integer. The effective electrical distance between the ground plane and the resistive sheet is adjusted by varying the fluid dielectric therebetween.

The present invention is a variation of an invention described, illustrated and claimed in copending U.S. patent application Ser. No. 485,239 by Eugene H. Klingler entitled, "Tunable Absorber," wherein the effective electrical thickness of a quarter wave absorber is varied without change in physical dimensions by application of a magnetic field or electric field or by variation in temperature. Controlled adjustment of these intensive quantities vary the permittivity and permeability of the dielectric material between the conductive ground plane and the impedance layer of a quarter wave absorber.

Thus it is a broad object of this invention to provide an improved quarter wave absorber.

It is another object of this invention to provide a radar attenuator operable over a broad frequency range.

Other objects and many of the attendant advantages of this invention will be readily appreciated as the same becomes better understood by reference to the following detailed description when considered in connection with the accompanying drawings wherein:

FIG. 1 is a graph of the thickness of a quarter wave absorber as a function of frequency with water as a dielectric material;

FIG. 2 illustrates in block form an attenuator system embodying the principles of this invention;

FIG. 3 illustrates a representative panel of radar attenuator material having a dielectric liquid permeating a foam between a ground plane and a conductive sheet;

FIG. 4 illustrates an alternative embodiment of attenuator having a rigid external surface;

FIG. 5 illustrates another alternative embodiment of attenuator having a rigid external surface;

FIG. 6 illustrates an alternative attenuator having elastic cords for maintaining a proper thickness; and FIG. 7 illustrates an inflatable structure embodying the principles of this invention.

Throughout the drawings like numerals refer to like parts.

An ideal quarter wave absorber comprises a perfectly conductive ground plane which assures that the electric field of electromagnetic radiation such as radar incident thereon is zero at the surface and that there is total reflection of the electromagnetic energy. Spaced apart from the conducting ground plane is an electrically thin resistive layer having an impedance of about 377 ohms per square. This is a material commonly known as "space cloth" since the impedance is substantially that of free space and conductive fabric is often so employed. With such an impedance no reflection occurs from the resistive sheet of space cloth. To form a quarter wave absorber the resistive layer is spaced from the ground plane at exactly one-quarter wave length of the radiation it is desired to absorb. A quarter wave absorber is described and illustrated by W. W. Salisbury in U.S. Patent 2,599,944.

Radar or other electromagnetic energy incident on such a quarter wave absorber passes through the resistive sheet of space cloth and is reflected by the conductive ground plane thereby setting up a standing wave. At the ground plane where reflection occurs the electric field is zero and at one-quarter wave length away from the ground plane the electric field is at a maximum. A resistive material placed at the position of maximum electric field permits some current flow and dissipates the radar energy in the form of heat. It is found that radar of a particular frequency when incident on a properly fabricated quarter wave absorber has no reflection therefrom. In a similar manner a resistive layer placed at three-quarters wavelength from the ground plane is also effective as a quarter wave absorber since the electric field of a reflected wave is again at a maximum. The same is true of higher odd integral numbers of quarter wavelengths.

The distance between the resistive sheet and the conductive ground plane in a quarter wave absorber is one-quarter wave length of the radiation it is desired to absorb. The wave length of concern is the wave length within the material between the resistive sheet and the conductive ground plane. In most quarter wave absorbers this dielectric material is air which has substantially the same electrical properties as free space and the resistive sheet is spaced from the ground plane one-quarter of the wave length of the radar in free space. Materials having a higher dielectric constant than air have been interposed between the resistive layer and the conductive ground plane in order to reduce the wave length of the radiation and minimize the total thickness of quarter wave absorber. Such absorbers have been limited to a single frequency.

The thickness of the quarter wave absorber or the distance between the resistive layer and the conductive ground plane is equal to $n\lambda/4$ where $n$ is an odd integer and $\lambda$ is the wave length of the radar in a lossless dielectric within the absorber. This is in turn equal to $$nc/4f\sqrt{(\mu/\mu_0)(\epsilon/\epsilon_0)}$$

where $c$ is the velocity of light, $f$ is the frequency of the radiation, $\mu$ is the magnetic permeability of the dielectric material between the ground plane and the resistive layer, $\mu_0$ is the permeability of free space, $\epsilon$ is the electric permittivity of the dielectric material and $\epsilon_0$ is the permittivity of free space. Thus when either the permeability or the permitivity of the material between the resistive sheet and the conductive ground plane is increased the thickness of the quarter wave absorber is decreased. Additional analysis of the absorption characteristics of an absorber is set forth in the aforementioned copending patent application. The permeability of most liquid materials is not greatly dissimilar from that of free space, however, the permittivity of many liquids is substantially higher than the permittivity of free space.

A convenient convention for the permittivity of a dielectric is the dielectric constant which is the relative permittivity of the dielectric to the permittivity of free space. Thus since the permeability of conventional liquids is approximately that of free space, the thickness of the quarter wave absorber for practical purposes is proportional to $$n/4f\sqrt{\epsilon_r}$$

$\epsilon_r$ is the dielectric constant of a substantially lossless dielectric material between the resistive layer and the conductive ground plane. Thus it is readily seen that the higher the dielectric constant of this material, the thinner and consequently the lighter in weight will be the quarter wave absorber.

A class of compounds with high dielectric constant comprises molecules having high dipole moments. The hydroxyl radical (OH—) has a particularly high dielectric constant. The cheapest and most readily available of these compounds is, of course, water which at room temperature and low frequencies has a dielectric constant of about 80. Other suitable and easily obtainable materials include methyl alcohol, glycerol, ethylene glycol, and hydrogen peroxide. Some other compounds have substantial dipole moments and dielectric constants, for example, small alkyl halide molecules such as methyl chloride. It will also be apparent to one skilled in the art that solutions such as salt water or ethylene glycol in water or slurries of insoluble solids in liquids are also useful for obtaining optimum electric and magnetic properties. Similarly gases can be used as dielectric for light weight attenuators and non-Newtonian fluids can be employed to alleviate hydrostatic head buildup in structures. Liquids having lower dielectric constants than water may be useful in some embodiments. Suitable materials include carbon tetrachloride and hexachlorobutadiene with constants from 2 to 5 and butyl alcohol or propyl alcohols with dielectric constants from 5 to 15.

By controlling the thickness of the dielectric layer, a quarter wave absorber can be tuned to attenuate different frequencies of incident electromagnetic radiation. If the dielectric layer comprises an elastic sponge-like material filled with a fluid, the thickness of the layer can be changed by adding or removing some of the fluid.

FIG. 1 is a graph showing the thickness of a quarter wave absorber that provides attenuation of radiation at a particular frequency. In this graph the logarithm of the thickness of the quarter wave absorber in inches is plotted against the logarithm of the frequency of radiation in gigacycles. The graph of FIG. 1 illustrates the thickness of a quarter wave absorber wherein water is employed as the dielectric material between a resistive layer and a conductive ground plane. On the right side of the graph there is indicated the approximate weight in pounds per square foot of a quarter wave absorber having the thickness shown in the left margin. The graph comprises a family of curves showing the absorber thickness for a series of odd integers $n$ in the equation wherein thickness is proportional to $$n/4f\sqrt{\epsilon_r}$$

As plotted in FIG. 1 the lowest curve corresponds to absorption at one-quarter wave length or $$1/4f\sqrt{\epsilon_r}$$

The higher curves in FIG. 1 illustrate the thickness as a function of frequency for higher odd integers $n$ from three through eleven. The curves illustrated in FIG. 1 are not quite linear since the dielectric constant of water varies somewhat as a function of frequency. These curves illustrate the thickness at which a particular frequency is completely absorbed by the quarter wave absorber. Less than complete absorption is obtained at thicknesses between the curves.

It is a characteristic of a quarter wave absorber that complete absorption is obtained when the thickness is any odd integral number of quarter wave lengths. Absorption is obtained at $\lambda/4$, $3\lambda/4$, $5\lambda/4$, etc. Thus, for example, complete absorption is obtained at point B on the graph for a frequency of about 3.5 gigacycles per second (or Gigahertz, GHz.) where the thickness is about 0.1 inch and also complete absorption is obtained for the same frequency at point C where the thickness of absorber is about 0.3 inch and the thickness corresponds to three-quarters of a wave length of radiation.

In accordance with principles of the present invention, in order to obtain attenuation of radar over a broad frequency range for optimum radar comouflage, the thickness of the quarter wave absorber is varied to provide complete absorption at a desired frequency. To attenuate radar of a lower frequency the thickness of the quarter wave absorber is increased by adding more fluid and to attenuate radar of a higher frequency the thickness is decreased by removing fluid. However, when the frequency is sufficiently high, instead of further decreasing the thickness, the absorber can be tuned to the first odd harmonic corresponding to $3\lambda/4$. Similarly at still higher frequencies, the absorber can be tuned to either the second odd harmonic thickness ($5\lambda/4$) or higher odd harmonic thicknesses ($7\lambda/4$, $9\lambda/4$, etc.). Thus, for example, if the thickness of a water filled quarter wave absorber is specified as having arbitrary upper and lower limits of 0.1 inch and 0.3 inch respectively, as might be typical of a particular structure, radar attenuation is readily obtained from a frequency of about 1.1 gigacycles on up. If it is desired to attenuate radiation at about 1.1 gigacycles, the thickness of the quarter wave absorber is adjusted to a point corresponding to point A in FIG. 1, namely a thickness of about 0.3 inch. This provides optimum attenuation at this frequency.

If it is desired to attenuate a higher frequency, the thickness of the quarter wave absorber is brought to a thickness along the line connecting points A and B of FIG. 1 corresponding to the frequency to be attenuated. At a frequency of 3.5 gigacycles a thickness of 0.1 inch is indicated on the lowest curve, which, as mentioned above, was arbitrarily set as a lower limit on the thickness of the quarter wave absorber. At this frequency it is possible to attenuate incident radiation at a thickness of about 0.1 inch or about 0.3 inch corresponding to points B and C respectively as mentioned above. Thus, the thickness of dielectric material between the resistive layer and the conductive ground plane can be either 0.1 or 0.3 inch.

As the frequency of radiation is increased above about 3.5 gigacycles, the thickness of the quarter wave absorber useful for attenuation of radiation within the arbitrary size limits previously mentioned follows along the line connecting points C and F on FIG. 1. At point $d$ on FIG. 1 radar at about 6 gigacycles is absorbed by a quarter wave absorber having a thickness corresponding to $$\frac{3}{4f\sqrt{\epsilon_r}}$$

The same frequency radiation is also absorbed by a quarter wave absorber having a thickness of about 0.3 inch as represented by point E on FIG. 1 which lies on a curve corresponding to a thickness of $$\frac{5}{4f\sqrt{\epsilon_r}}$$

At frequencies above 6 gigacycles it is therefore possible within the arbitrary thickness limits set to absorb radar at a thickness that lies along the line connecting points D and F of FIG. 1 or along the line connecting points E and G of FIG. 1. It will be readily appreciated that as higher frequencies are encountered that further odd multiples of the basic quarter wave absorber can be employed for attenuation of radar.

Complete absorption is obtained at a thickness that is exactly that indicated by the curves on the graph of FIG. 1, and at thicknesses intermediate the curves a decreased attenuation is obtained, with substantially complete reflection occurring at a thickness midway between the curves. Thus it is apparent that close thickness control is required for optimum attenuation, particularly at higher frequencies. As will be apparent, the precision required for optimum absorption is ameliorated by employing a fluid with a lower dielectric constant than water, and absorption at low odd integers $n$ is provided at higher frequency than when water is employed in the absorber. Similarly the lowest frequency absorbed by a quarter wave absorber having an arbitrary maximum thickness limit is decreased by employing a material having a higher dielectric constant than water.

In some instances it is desirable to have a minimum thickness of quarter wave absorber with a consequent sacrifice of available bandwidth. In this case a thin layer of high dielectric constant material such as barium titanate or the like can be provided adjacent the conductive ground plane. Preferably particles of high dielectric solid are dispersed through the liquid. This dispersion can be as a slurry of solids in a liquid or preferably is distributed in a foam material as hereinafter described.

In order to attenuate radiation over a broad frequency range, it is desirable to adjust the thickness of the quarter wave absorber to a thickness optimum for any given frequency in the range. This is accomplished by adjusting the distance between the ground plane and the resistive layer and filling the space therebetween with a suitable dielectric. The simplest technique for accomplishing this is to vary the volume of liquid between the ground plane and the resistive layer, thereby varying the distance therebetween.

FIG. 2 illustrates in block form a radar attenuator system incorporating the principles of this invention. As illustrated in this embodiment there is provided an electrically conductive ground plane 10 which preferably comprises a sheet of metal. It will be understood that although the term "ground plane" is employed, that this sheet of metal is not necessarily a geometric plane but may have any necessary curvature. Spaced apart from the ground plane 10 is a resistive layer 11. This resistive layer preferably comprises a fluid impervious flexible material having an impedance of about 377 ohms per square. A suitable material for this resistive layer comprises a sheet of fabric impregnated or coated with an elastomer having carbon particles dispersed therein. The size, type, and proportion of carbon particles distributed in the elastomer determines the electrical impedance of the resistive layer and an impedance of 377 ohms per square is readily obtained. Such a material, sometimes known as space cloth, is commercially available. It may be desirable in some instances to employ a resistive layer having an impedance different from 377 ohms per square to obtain minimum reflectance from a surface. A range of impedance from about 300 to 500 ohms per square is usually sufficient. Thus, for example, at about 30 gigacycles per second and higher frequencies the loss tangent of water is a significantly high quantity and optimum attenuation is obtained with a layer having an impedance having a reactive portion to better match the impedance of water with that of free space. A suitable reactive front layer is described in U.S. Patent 2,875,435.

Between the ground plane 10 and the resistive layer 11 there is provided a liquid dielectric material 12 which is preferably water. In the preferred embodiment the water is connected by conduit 13 to a reservoir 14 having a variable volume so that water can be either added to or removed from the space between the ground plane 10 and the resistive layer 11 as desired.

The frequency of radar incident on a structure having a fluid operated quarter wave absorber of variable thickness is readily detected by conventional electronic apparatus or by intelligence information. The thickness of the quarter wave absorber is then manually adjusted to have an optimum value corresponding to maximum absorption of radar of the detected frequency. Manually controlled valves and pumps are readily manipulated to obtain a desired thickness with good accuracy.

In many tactical situations it may be desirable to adjust the thickness of the radar absorbing material to the optimum for the threat radar at a more rapid rate than can be provided manually. When this is desired automatic means are readily provided for adjusting thickness in response to frequency variations. A typical automatic system that can be employed is illustrated in block form in FIG. 2. As will be apparent to one skilled in the art, other automatic systems are also employed for computing the desired thickness of quarter wave absorber and controlling fluid for obtaining this thickness.

In order to determine the frequency of radar to be attenuated, there is provided in the attenuator system illustrated in FIG. 2 an antenna 16 for receiving radar that is incident on the attenuator. This radar energy is amplified in an amplifier 17 and fed to a frequency discriminator 18 that provides a signal having a voltage corresponding to the frequency of the received signal. If desired a local oscillator can be provided for a reference frequency and mixed with the radar frequency signal before application to the discriminator. The signal from the frequency discriminator 18 is applied to a division circuit 19 that provides an output signal proportional to $1/4f\sqrt{\epsilon_r}$. It will be appreciated that in the situation where $\epsilon_r$ is not independent of frequency stored information concerning the frequency dependence is readily provided and employed in obtaining the signal proportion to $1/4f\sqrt{\epsilon_r}$. The signal from the division circuit 19 is amplified by an amplifier 20 and applied to a comparator 31. This signal has a voltage magnitude corresponding to the desired thickness of the quarter wave absorber. Also applied to the comparator 31 is a signal corresponding to the thickness of the quarter wave absorber. This thickness is readily determined by a position transducer 32 which determines the location of the movable resistive layer 11 relative to the fixed ground plane 10. Any of a number of conventional position or thickness transducers are readily employed for determining the thickness of the quarter wave absorber. Commercially available resistive, capacitive, or inductive transducers can be employed for the position transducer 32.

Any error signal from the comparator 31 corresponding to a difference between the desired quarter wave absorber thickness and the determined quarter wave absorber thickness is applied to a servo amplifier 33 which provides a signal to an electromechanical converter 34. The electromechanical converter 34 is coupled to the water reservoir 14 for varying the volume thereof and hence the thickness of the quarter wave absorber. In the illustrated embodiment the electrochemical converter is illustrated schematically as a piston controlling device having a position corresponding to the electrical signal from a servo amplifier. It will be readily appreciated by one skilled in the art that variable volume hydraulic pumps, pneumatic controlled bladders or other electro-mechanical converters can readily be employed to vary the volume of the water reservoir 14 and hence the thickness of the quarter wave absorber.

It is desirable in constructing a quarter wave absorber for use in the practice of this invention to provide an elastic material between and secured to both the resistive layer 11 and the conductive ground plane 10. In this manner a uniform change in thickness throughout the area of the dielectric layer is obtained when liquid is added to or withdrawn from the quarter wave absorber. In order to obtain good attenuation of radar, it is desirable that the resistive layer 11 be substantially uniformly spaced from the ground plan 10 throughout its extent. For this reason it is desirable to have some uniform restoring attractive force between the resistive layer and the ground plane. Such an attractive force is conveniently obtained by securing an elastic material to the resistive layer and also to the ground plane by cementing or the like. Such an elastic material should be substantially unextended or partially compressed at the minimum thickness of the quarter wave absorber and be extended at the maximum thickness thereof.

Thus as illustrated in the partial cutaway view of FIG. 3 there is provided a typical panel of radar attenuating material constructed according to the principles of this invention. The panel illustrated in FIG. 3 is not presented as a representation of the scale of panel dimensions, but is shown as a comparatively small panel in order to better illustrate the principles of this invention. It will be understood that a panel of radar camouflage material would have an extent much larger than the wavelength of radar incident thereon. Such a panel is readily employed as radar camouflage for an object behind the panel or can be employed as a structural element in a vehicle or other potential target, or a number of similar panels can be employed for radar camouflage. The panel is employed in a manner so that incident radar impinges on the surface comprising the resistive layer as illustrated by the arrow in FIG. 3.

The panel of FIG. 3 comprises a conductive ground plane 10 and spaced therefrom a resistive layer 11. In a preferred embodiment the conductive ground plane 10 comprises a rigid sheet of metal which is a good conductor of electricity. The resistive layer 11 is preferably a flexible fabric or the like impregnated with a rubber having carbon particles disposed therein so as to have an impedance of about 377 ohms per square (space cloth). Between the conductive ground plane and the resistive layer there is an elastic sponge-like foam material 36 that is adhesively bonded to both the ground plane and the resistive layer. This foam is preferably a sponge rubber or the like since this has good elastic properties and provides a substantial attractive force between the ground plane and the resistive layer to which it is secured. Other foam materials having communicating pores such as, for example, polyurethane or the like can also be employed. Particles of solids can be dispersed in the foam to obtain optimum electrical properties, such as, for example, high dielectric constant which is obtained with a dispersion of barium titanate or the like in the foam. It is important that the most, if not all, of the pores in the foam material be in communication so that a dielectric liquid such as water can thoroughly permeate the foam and be added thereto and extracted therefrom when desired. In order to add and subtract liquid from the foam material a conduit 13 is provided in communication therewith. It will be apparent that a multiplicity of manifolded conduits 13 can be provided in communication with the foam to obtain rapid and uniform distribution of liquid.

Also illustrated in the panel of FIG. 3 is a typical edge structure for a fluid operated quarter wave absorber constructed according to the principles of this invention. This edge structure prevents leakage of liquid from the absorber and provides a pressure sealed vessel. Other edge structures will be apparent to one skilled in the art. As illustrated in FIG. 3 there is provided a non-porous plastic or resinous material 37 bonded to the metal ground plane 10. The edge of the resistive layer 11 is imbedded in the plastic to provide a liquid seal and also mechanical strength. Adjacent the edge a double fold 38 of the resistive layer 11, suitably mitered in the corners, is provided to accommodate changes in volume of the dielectric. A cloth resistive layer has good flexibility for folding in the illustrated manner and has a small degree of stretch so that folds are desirable to provide for ready movement of the resistive layer under the influence of fluid pressure. The plastic or resinous material 37 preferably comprises an epoxy resin or the like and may also have carbon particles dispersed therein to provide some absorption of radar energy and minimize reflections from the edges of the fluid operated quarter wave absorber. Similarly it will be apparent that a bellows like arrangement of the cloth resistive layer can be employed at the edges to accommodate changes in thickness of the assembly.

The thickness of the foam 36 at equilibrium is preferably intermediate between the maximum and minimum thicknesses between which it is desired to operate the quarter wave absorber. Thus when liquid is added to the foam material the resistive layer 11 is forced away from the ground plane 10 and the foam is elastically stretched. In this condition the pressure of fluid in the foam is higher than the pressure on the opposite side of the resistive layer. Similarly when fluid is withdrawn from the foam and the pressure within the quarter wave absorber is less than the pressure on the opposite side of the resistive layer 11, the foam material is elastically compressed and the resistive layer is closer to the ground plane than at equilibrium. Thus, for example, in a fluid expanded attenuator having arbitrary thickness limits of 0.1 and 0.3 inch as described above, it is preferred that the foam material at rest have a thickness of about 0.2 inch. Thus when fluid is added to the foam a fifty percent extension gives a thickness of 0.3 inch and a fifty percent compression gives a thickness of 0.1 inch. Such deformation is well within the capability of sponge rubber and a greater range of deformation can often be employed.

FIG. 4 illustrates in cross section an alternative embodiment of attenuator wherein the front surface is rigid and the back surface is flexible. As will be apparent radar energy is attenuated when it is incident on the quarter wave absorber on the side having the resistive layer. Thus the resistive layer is conventionally known as a front surface and the conductive ground plane is known as the back surface. In the embodiment of FIG. 4 there is provided a resistive layer 40 which is preferably a rigid plastic material such as, for example, a few layers of glass cloth having an impregnation of epoxy resin or the like having conductive particles distributed therein. This provides a rigid layer having a resistivity of about 377 ohms per square. Similarly a sheet of conventional space cloth can be secured to a rigid plastic base. The conductive ground plane of the attenuator of FIG. 4 comprises a flexible plastic sheet 41 such as polyethylene terephthalate available under the trademark Mylar. A layer of metal 42 such as aluminum is deposited on one side of the plastic layer 41 to provide electrical conductivity. The aluminum can be on either side of the Mylar and it may be desirable in some instances to have it on the side opposite from the liquid to minimize difficulties due to corrosion. The conductive layer of metal 42 preferably has a thickness substantially greater than the thickness of the skin effect in the frequency range of interest so that the resistivity of the metal layer is low. Between the rigid front resistive layer 40 and the flexible ground plane 41 and 42 there is provided a layer of foam rubber or the like 43. As will be apparent the alternative embodiment of FIG. 4 operates in substantially the same way as the embodiment of FIG. 3 except that the front surface remains rigid and the back conductive ground plane moves relative thereto when fluid is added to or subtracted from the foam. This alternative embodiment has an advantage when it is desired to have a structure having a fixed external geometry having a variable radar attenuating material thereon.

FIG. 5 illustrates another alternative embodiment of an attenuator having a rigid external surface. In this embodiment there is provided a rigid front layer 45 which is preferably an epoxy resin impregnated glass fabric. A conductive ground plane 46 such as metal is provided at a fixed distance from the rigid front sheet 45. In between the front layer 45 and the ground plane 46 there is provided a resistive layer 47 which preferably comprises a sheet of flexible space cloth as has been previously described. Between the rigid front sheet 45 and the resistive layer 47 and adhesively bonded thereto is provided a layer of foam rubber 48. In the space between the resistive layer 47 and the ground plane 46 there is provided a dielectric liquid 49. A conduit 13 is provided communicating with the space between the resistive layer 47 and the ground plane 46 for adding or withdrawing liquid from the space therebetween. When liquid is added to the structure the foam material 48 is compressed and the resistive layer 47 is forced away from the ground plane 46. Conversely when liquid is withdrawn the foam rubber provides a force for pressing the resistive layer 47 toward the ground plane 46, thereby decreasing the effective electrical thickness of the quarter wave absorber. In this as in other alternative embodiments, an edge structure analogous to that described and illustrated in FIG. 3 is readily provided.

Thus the embodiment of FIG. 5 has rigid front and back surfaces and a movable resistive layer therebetween. This embodiment has advantages in certain situations where rigid construction is desirable and also has advantage when fluid is rapidly added to or subtracted from the assembly since the resistance to the fluid flow is less than when the fluid permeates a foam material.

FIG. 6 illustrates an alternative embodiment of a quarter wave attenuator employing plastic strands between the resistive layer and the ground plane. As illustrated in this embodiment there is provided a resistive layer 51 spaced apart from a conductive ground plane 52. The resistive layer is preferably a sheet of space cloth as described above and the ground plane is preferably a sheet of metal. Between the resistive layer and the ground plane and secured thereto are a plurality of elastic strands 53. These strands are preferably thin strips of rubber and are cemented or stitched to the resistive layer and the ground plane. The elastic strands 53 are positioned at an angle to the ground plane with a portion of the strands having a direction from the ground plane different from the direction or directions of one or more other portions of the strands from the ground plane. This provides a truss-like structure that minimizes shifting of the resistive sheet 51 relative to the ground plane 52. In such an arrangement the minimum thickness of the quarter wave absorber corresponds to the unstretched length of the elastic strands since these strands are unable to resist compressive forces. When fluid is added to the quarter wave absorber the elastic strands are stretched so that the resistive layer 51 is displaced from the ground plane 52. Such a construction provides a uniform thickness of quarter wave absorber over its entire area and still maintains a large cross-sectional area for fluid flow so that rapid addition or withdrawal of fluid can be made.

FIG. 7 illustrates an inflatable radar camouflage shelter having walls incorporating the principles of this invention. As illustrated in this figure there is provided a flexible floor 56 and a flexible wall structure 57 sealed thereto. A pump 58 is provided for inflating the structure by pumping air into the space between the floor 56 and the walls 57. An airlock 59 is provided for access into the shelter without danger of collapsing the structure due to the release of air. A control system 60 of the type illustrated in FIG. 2 is provided in the shelter with a conduit 13 communicating with the wall 57 for providing a dielectric fluid thereto. The wall structure 57 is preferably of a type similar to that illustrated in FIG. 4 having a flexible ground plane except that the front resistive layer is also flexible so that the structure as illustrated in FIG. 7 can be collapsed or inflated at will. As will be apparent a structure of the type illustrated in FIG. 7 is useful for temporary storage and camouflage of equipment or the like that is reflective of radar. Such a structure is readily tuned to a quarter wave thickness for radar of a given frequency incident thereon so that it has substantially the same radar reflectance as the surrounding terrain and is substantially indistinguishable therefrom.

Obviously many modifications and variations of the present invention are possible in light of the above teachings. It is therefore to be understood that the invention may be practiced otherwise than as specifically described.

What is claimed:

1. In an active attenuator of electromagnetic energy having a conductive ground plane and a layer of resistive material spaced therefrom, the improvement comprising means for controllably varying the thickness of the attenuator including a fluid of known electric permittivity between the ground plane and the resistive material and fluid control means for controllably varying the amount of said fluid to vary the effective permittivity of the attenuator between the ground plane and the resistive material.

2. In an active attenutaor of electromagnetic energy having a conductive ground plane and a layer of resistive material spaced therefrom, the improvement comprising means for controllably varying the thickness of the attenuator including a previous and expandable material between the ground plane and the resistive material, a fluid of known electric permittivity amid the pervious material and fluid control means for controllably varying the amount of said fluid amid the pervious material for varing the effective permittivity of the attenuator between the ground plane and the resistive material.

3. An improved active attenuator as defined in claim 2 further comprising means responsive to frequency of electromagnetic energy impinging on the attenuator for operating the fluid control means.

4. An active radar camouflage structure comprising:
a conductive ground plane;
a resistive layer having an impedance of about 377 ohms per square spaced from said ground plane and substantially parallel thereto; and a pervious elastic material between said ground plane and said layer.

5. An active radar camouflage structure as defined in claim 4 further comprising:
a fluid pervading said elastic material; and
means for varying the volume of fluid pervading said elastic material.

6. An active radar camouflage structure as defined in claim 5 wherein said fluid comprises a liquid having a high dielectric constant.

7. An active attenuator of electromagnetic energy comprising:
a conductive ground plane;
a resistive layer having an impedance of about 377 ohms per square spaced from said ground plane;
a liquid dielectric between said ground plane and said resistive layer; and
means for varying the volume of liquid between said ground plane and said resistive layer for varying the distance therebetween.

8. An active attenuator as defined in claim 7 wherein said resistive layer is rigid and wherein said ground plane comprises a flexible material having a layer of metal thereon.

9. An active attenuator as defined in claim 7 wherein said conductive ground plane comprises a rigid metal and said resistive layer comprises a flexible material and further comprising:
a rigid layer transparent to electromagnetic energy spaced apart from said resistive layer on the side opposite from said ground plane; and
an elastic material between said rigid layer and said resistive layer.

10. An active attenuator as defined in claim 7 wherein said conductive ground plane comprises a rigid metal, and said resistive layer comprises a flexible material; and further comprising:
a pervious elastic material between said ground plane and said resistive layer.

11. An active attenuator as defined in claim 10 wherein said pervious elastic material comprises a foam elastomer.

12. An active attenuator as defined in claim 10 wherein said pervious elastic material comprises a plurality of elastic strands.

13. A method of attenuating electromagnetic energy of arbitrary frequency comprising:
sensing the frequency of electromagnetic radiation; and
changing the volume of fluid between a ground plane and a resistive sheet to obtain a distance therebetween equal to $n/4$ times the wavelength of the radiation in the fluid where $n$ is an odd integer.

14. An active radar camouflage structure comprising:
a conductive ground plane;
a resistive sheet having an impedance of about 377 ohms per square spaced from said ground plane and substantially parallel thereto;
a liquid dielectric between said ground plane and said conductive sheet;
means for receiving electromagnetic radiation incident on the attenuator;
means for detecting the frequency of the radiation; and
means for adjusting the distance between said sheet and said ground plane to a distance equal to $n/4$ times the wavelength of the radiation in said dielectric, where $n$ is an odd integer.

15. A radar camouflage shelter comprising:
a flexible impervious floor;
at least one flexible impervious wall secured to said floor to at elast partially define a gas tight envelope, said wall having a high electric conductivity whereby said wall comprises a ground plane;
means for inflating said envelope;
a flexible impervious resistance layer spaced apart from said wall to cooperate with said wall to form a quarter wave absorber; and
means for controlling the volume of fluid in the space between said wall and said resistance layer for controlling the distance therebetween.

16. An active attenuator of electromagnetic energy comprising:
a conductive ground plane;
a resistive sheet spaced from said ground plane and substantially parallel thereto;
a dielectric liquid between said ground plane and said sheet; and
means for adjusting the distance between said ground plane and said sheet to a distance equal to $n/4f\sqrt{(\mu/\mu_0)(\epsilon/\epsilon_0)}$ where $n$ is an odd integer, $f$ is the frequency of electromagnetic radiation incident on the attenuator, $\mu$ is the permeability of said dielectric liquid, $\mu_0$ is the permeability of free space, $\epsilon$ is the permittivity of said dielectric liquid and $\epsilon_0$ is the permittivity of free space.

17. An active radar camouflage structure comprising:
an electrically conductive ground plane;
an electrically resistive sheet having an impedance of about 377 ohms per square space from said ground plane and substantially parallel thereto;
a pervious elastic material between said ground plane and said sheet;
a dielectric liquid pervading said elastic material;
an antenna for receiving electromagnetic radiation incident on the attenuator and providing a frequency signal having the frequency of the radiation;
an amplifier connected to the antenna for amplifying the frequency signal;
means for converting said frequency signal to a distance signal corresponding to $n/4f\sqrt{(\mu/\mu_0)(\epsilon/\epsilon_0)}$ where $n$ is an odd integer, $f$ is the frequency of electromagnetic radiation incident on the attenuator, $\mu$ is the permeability of said liquid, $\mu_0$ is the permeability of free space, $\epsilon$ is the permittivity of said liquid and $\epsilon_0$ is the permittivity of free space;
means for varying the volume of said liquid between said ground plane and said sheet in response to the distance signal, whereby the distance between said ground plane and said sheet is varied; and
a distance sensor coupled to said ground plane and said sheet for providing a feedback signal for said means for varying the volume of said liquid.

References Cited

UNITED STATES PATENTS 2,867,802  1/1959  Lindenblad _____ 343—767

RODNEY D. BENNETT, *Primary Examiner.*

CHESTER L. JUSTUS, *Examiner.*

C. E. WANDS, *Assistant Examiner.*